United States Patent [19]

Ishida et al.

[11] Patent Number: 4,857,354

[45] Date of Patent: Aug. 15, 1989

[54] METHOD FOR PRODUCING BAKED PRODUCTS

[75] Inventors: Kunio Ishida, Kawasaki; Satoshi Saito, Tokyo; Akinaka Habuto; Tadahiko Murata, both of Yokohama; Hisayoshi Oiso, Tokyo; Norio Joyama, Yokohama; Kazuhiro Fujimoto, Yachiyo, all of Japan

[73] Assignee: Meiji Seika Kaisha, Ltd., Tokyo, Japan

[21] Appl. No.: 266,282

[22] Filed: Oct. 26, 1988

Related U.S. Application Data

[60] Continuation of Ser. No. 3,431, Jan. 15, 1987, abandoned, which is a division of Ser. No. 809,820, Dec. 17, 1985, Pat. No. 4,655,125.

[30] Foreign Application Priority Data

Feb. 15, 1985 [JP] Japan .................. 60-26502
May 28, 1985 [JP] Japan .................. 60-78427

[51] Int. Cl.⁴ .............................................. A21D 10/00
[52] U.S. Cl. ..................................... 426/558; 426/549
[58] Field of Search ................................. 426/549, 558

[56] References Cited

U.S. PATENT DOCUMENTS

1,795,980  3/1931  Wahl ................................... 426/558
4,247,568  1/1981  Carrington et al. ............ 426/661 X

FOREIGN PATENT DOCUMENTS

0074945  4/1984  Japan .................................. 426/558
0130124  7/1984  Japan .................................. 426/558
0166030  9/1984  Japan .................................. 426/558
0160833  8/1985  Japan .................................. 426/558

*Primary Examiner*—Joseph Golian
*Attorney, Agent, or Firm*—Armstrong, Nikaido, Marmelstein, Kubovcik & Murray

[57] ABSTRACT

A method and apparatus for producing baked products such as sponge cake and crepe sheet for wrapping jam, cream or the similar filling. A sponge cake batter or a crepe batter therefor comprises a starch hydrolysate, a water-soluble thickening agent and/or gluten, in addition to conventional basic raw materials. The batter is treated on a baking roller comprising a stationary tubular body of a magnetic material, an exciting coil body arranged on the stationary tubular body and a rotatable outer hollow cylindrical member of a magnetic material.

3 Claims, 2 Drawing Sheets

METHOD FOR PRODUCING BAKED PRODUCTS

This application is a continuation of prior application Ser. No. 003,431, filed Jan. 15, 1987 now abandoned, which is a division of parent application Ser. No. 809,820, filed Dec. 17, 1985, now U.S. Pat. No. 4,655,125, issued Apr. 7, 1987.

BACKGROUND OF THE INVENTION

1. Field of the Invention

The present invention relates to a method for producing baked products, especially sponge cake and a crepe for wrapping jam, cream, chocolate and the like.

2. Related Arts

A product having a good elastic texture, solubility in the mouth, flexibility and other factors is required for baked products such as sponge cake and a crepe sheet.

Hitherto, various methods for producing baked products have been proposed. For instance, a method was proposed for improving the quality of sponge cake in Examined Jap. pat. appln. Gazette No. 31 746/1969, where there is added to a basic raw material containing wheat flour as a main component, 0.1 to 2% of a polysaccharide gum obtained by subjecting a starch or its decomposition product to fermentation. Also added is 2–7% of a quality improving agent comprising 10 to 40 parts of a polyhydric alcohol or a starch decomposition product, 10 to 60 parts of a surface active agent, 1 to 5 parts of a synthetic or natural high molecular compound and 1 to 5 parts of a protein. Another method was proposed for producing a crepe sheet in Unexamined Jap. pat. appln. Gazette No. 74 945/1984, wherein wheat flour, eggs, oil or fat and water are added and mixed together to prepare a batter and then baked to make the sheet.

While, for producing such a baked product, an apparatus was proposed in Examined Jap. pat. appln. Gazette No. 6 545/1975, which comprises a rotary drum, a heater incorporated in the rotary drum to heat an outer surface of the rotary drum to a predetermined temperature level by an electric heater, and a flat nozzle with a cooling member to supply a batter on the outer surface of the rotary drum for baking the batter to make it into a baked sheet-like product such as the sheet of crepe, omelet or spring roll.

In the method disclosed in said Examined Jap. pat. appln. Gazette No. 31 746/1969, a polysaccharide gum is added to the basic raw material or in addition thereto, the quality improving agent containing as its main components, a polyhydric alcohol such as glycerine, methylcellulose and a surface active agent is added to delay staling and retrogradation of the product, but water-activity in the product is somewhat higher, and thus growth of bacteria can not be sufficiently inhibited. Therefore, the resulting product can not be stored over a long period of time. Further, mouth feel gradually becomes worse due to the staling and retrogradation or oxidation of the product in the course of time. In the method disclosed in said Unexamined Jap. pat. appln. Gazette No. 74 945/1984, an outstanding degree of mechanical folding is imparted to the product by adding xanthan gum to the basic raw material and setting the final moisture content of the baked product at 40 to 45%, but an inhibition of bacteria growth was likewise not attained and thus the product can not be stored over a long period of time. It is, therefore, similar to the former method.

According to the apparatus as disclosed in said Examined Jap. pat. appln. Gazette No. 6 545/1975, the heater per se is rotated together with the rotary drum. In such a structure, it is necessary to have a rotary transducer and a power supply device with a special slip ring which withstands a high electric power which is supplied to the heater. The thickness of the rotary drum should, of course, be made larger for accommodating or incorporating the heater therein to require much time for heating up the surface of the rotary drum to a desired level and this means that an expensive material having a high efficiency in thermal conductivity, such as copper should be selected for the rotary drum. Since the heater is embedded in the rotary drum, further, it is difficult to repair, when a heating wire is broken. Additionally it is difficult to attain uniform heating of the rotary drum, so that the entire outer surface thereof can not be served as the heating area, since the baking temperature of both sides thereof is relatively lower than the center area.

SUMMARY OF THE INVENTION

An object of the invention is to provide a useful method and apparatus for producing baked products.

A specific object of the invention is to provide a method for producing baked products which can be stored over a relatively long time period without causing any noticeable reduction in quality, mouth feel and other characteristics thereof.

Another specific object of the invention is to provide an apparatus for producing baked products wherein a rotary drum can be uniformly heated in a relatively short time period and a heating element therefor is not rotated.

According to one of the aspects of the invention, the method is characterized in that for a basic raw material for a baked product, a starch hydrolysate, a water-soluble thickening agent obtained from an animal, plant or through a microbe and/or gluten is added and mixed, and then the resulting material is baked.

The term of "basic raw material" means materials generally employed in producing conventional baked products, such as wheat flour, sucrose, egg, edible oil or fat, milk and the like. As the water-soluble thickening agent, gelatin, locust bean gum, guar gum, xanthan gum or the like may be employed, but the xanthan gum is the most preferable among them, in view of its characteristics for providing a hardness, elasticity and palatability to the baked product. It is preferable to add the water-soluble thickening agent in an amount of about 0.1 to 0.5 weight % based on the total weight of the ingredients. If the added amount thereof is less than about 0.1 weight %, the resulting baked product has not sufficient elasticity, is very fragile and gives a bad mouth feel and if the added amount is higher than about 0.5 weight %, a vaporization of moisture during the baking is strongly inhibited and the resulting baked product will become gummy. According to the method of the invention, the gluten is added to improve mouth feel of the resulting baked product. It is preferable to add the gluten in an amount of about 1.0 to 1.5 weight % based on the total weight of the ingredients. If the added amount is less than about 1.0 weight %, the apparent specific density of the baked product becomes too high to reduce mouth feel and more particularly a solubility in the mouth. If the added amount is higher than about 1.5 weight %, the apparent specific density becomes too low and also causes an undesirable change in mouth feel and in addition thereto, the outer surface of the baked product becomes rough and undesirable and reduces its value or marketability. The term of "the total weight of the ingredients" means the total of raw materials as referred to, and a water-soluble thickening agent and/or gluten excluding additional water. But in the case of using city milk, it is calculated as dry matter. The use of combining the water-soluble thickening agent and the gluten in said ranges provides a crepe sheet having a somewhat hard and tough texture, which is suitable for wrapping somewhat hard filling or a filling of a larger amount, such as a hamburg steak, a salad and the like. Included in the starch hydrolysate, there may be listed degradation products of starch such as a glucose syrup, dextrin and the like converted with acids, enzymes or pressurized treatment, derivatives of starch, or degradation products of the derivatives, for instance starch acetate, hydrogenated starch hydrolysate, starch monophosphate and the like, which can be obtained through a chemical reaction of a reduction or oxidation, chemical cross-linking or the like. According to the invention, the starch hydrolysate is added to be a substitute for raw material wheat flour and more particularly for the starch component therein to reduce water-activity and to prevent staling and retrogradation. It is preferable to use the starch hydrolysate having a mean molecular weight higher than about 655 to attain this purpose and not to influence mouth feel of the baked product. If the mean molecular weight is less than about 655, the resulting baked product has an undesirable mouth feel, and staling or retrogradation takes place, i.e. the property of the baked product is similar to the substitution of monosaccharides or disaccharides. It is preferable to add the starch hydrolysate in an amount of about 20 to 60 weight % and more particularly of about 30 to 50 weight % based on the total weight of the starch hydrolysate and the wheat flour. If the added amount is less than about 20 weight %, the staling or deterioration of the baked product can not sufficiently be avoided, and in the case of about 60 weight % or more, the mouth feel of the baked product will become harder, due to the physical characteristics of the starch hydrolysate. The preferred starch hydrolysates which may be used in the present invention are glucose syrups, dextrins, hydrogenated starch hydrolysates and the like having a mean molecular weight of at least about 655. The hydrogenated starch hydrolysates are obtained by the hydrogenation of glucose syrups, dextrins and maltodextrins in the presence of Raney Ni, which proceeds without isomerization and decomposition. The thus obtained hydrogenated starch hydrolysates typically contain a mixture of glucitol and hydrogenated oligosaccharides as well as other hydrogenated products. Method of making hydrogenated starch hydrolysates are disclosed in Examined Jap. pat. appln. Gazette No. 18 898/1969.

It is preferable that the baked product produced by the method of the invention have a moisture content less than about 35 weight % and more particularly in a range of about 27 to 32 weight %. If it exceeds more than about 35 weight %, the water-activity in the baked product will become higher than about 0.92 and in consequence the desired effect on inhibition of bacteria growth will not occur.

According to the method of the invention, excellent baked products can be produced, which show a good mouth feel and solubility in the mouth, and which will withstand storage for a relatively long time period.

The degree of sweetness of the product can be selected according to demand.

According to the other aspect of the invention, the apparatus comprises an open vessel to store batter for the baked product, a transcription roller which is rotary driven and a part of which is immersed in the batter in said open vessel to feed the batter adhered on its outer surface thereof, a baking roller arranged adjacent to said transcription roller to bake the batter transcribed from said transcription roller to its outer heating surface, and a scraper for peeling off the baked product from said baking roller, said baking roller comprising a stationary tubular body of a magnetic material, which has a longitudinal slit extending from one end to the other end, an exciting coil body arranged on said stationary tubular body, and an outer hollow cylindrical member of a magnetic material, which is rotatably supported in a concentric manner to said stationary tubular body and adjacent to and outside of said exciting coil body.

In the apparatus having such a structure, an alternative magnetic flux is generated in a closed magnetic circuit formed by the stationary tubular body, exciting coil body and rotatable outer hollow cylindrical member, when the exciting coil body is connected to an alternative current source. Due to generation of the alternative magnetic flux, a short circuit current flows in the outer hollow cylindrical member in pheripheral direction thereof to generate Joule heat which rises the temperature of the outer hollow cylindrical member. The outer hollow cylindrical member is also heated based on hysteresis loss, as the alternative magnetic flux passes therethrough. Therefore the outer hollow cylindrical member is sufficiently heated for baking the batter transcribed on its outer surface from the transcription roller.

According to the apparatus of the invention, as seen from above, special parts required for the conventional apparatus, such as a slip ring, rotary transducer and the like can be omitted to make a mechanical structure thereof simple to remarkably increase the durability and make maintenance thereof easy. The outer hollow cylindrical member of the baking roller has no heating element embedded therein and thus non-expensive thin magnetic metal material can be employed. Further, a rapid and uniform heating of the outer hollow cylindrical member can easily be attained, so that the entire outer surface thereof can be served as a baking area to improve productivity of the baked product.

BRIEF DESCRIPTION OF THE DRAWINGS

In the first place, an apparatus according to the invention will be explained with reference to drawings, in which FIG. 1 is a schematic side view of an apparatus according to the invention, FIG. 2 is a front view of the apparatus as shown in FIG. 1, FIG. 3 is a front view of a baking roller which constitutes an essential part of the apparatus as shown in FIG. 1, a part of the baking roller being shown in section to show inner structure thereof, FIG. 4 is a vertical section taken along lines IV—IV in FIG. 3, and FIG. 5 is a front view similar to FIG. 2 but of another embodiment.

DESCRIPTION OF PREFERRED EMBODIMENTS OF THE INVENTION

In FIGS. 1 and 2, there is schematically shown a preferable embodiment of the apparatus 10 according to the invention. In the figures, reference numeral 12 shows an open vessel to accommodate batter 14 for producing a relatively thin sponge cake or a sheet for baked product such as crepe, spring roll, omelet and the like. Above the open vessel 12, a transcription roller 16 is rotatably arranged, so that a part of the transcription roller 16 is immersed or dipped in the batter 14 to continuously transfer the batter to an outer surface of the transcription roller 16 by its adhesiveness. Adjacent to an outer periphery of the transcription roller 16, there is arranged a doctor blade 16a to adjust the thickness of an adhered batter layer 14a in constant, which depends on a set position of the doctor blade 16a. A baking roller 18 is arranged above and in parallel to the transcription roller 16 to receive the batter layer 14a therefrom. Adjacent to an outer periphery of the baking roller 18 and at a position apart from the batter receiving position, there is arranged a scraper 18a to peel off the baked product 14b which may be fed by a transferring device 20 such as a conventional belt conveyor. The resulting baked continuous web-like product 14b can be severed by a cutting device (not shown) which may be arranged above the belt of the transferring device 20. The transcription roller 16 and baking roller 18 may be synchronizedly driven by a common electric motor but it is preferable to drive each roller 16, or 18 by a different electric motor 22 or 24 (FIG. 2) which is able to adjust its rotational speed, so that the baking condition can be modified depending on the composition and thickness of the batter 14 as well as other various factors.

In FIGS. 3 and 4, there is shown the baking roller 18 in more detail. As seen from the figures, the baking roller 18 comprises a stationary tubular body 24, an exciting coil body 26 arranged on the stationary tubular body 24 and an outer hollow cylindrical member 28 arranged rotatably to a core member of the stationary tubular body 24 and coil body 26. Both of the stationary tubular body 24 and the outer hollow cylindrical member 28 are made of a magnetic material such as iron, carbon steel, silicon steel or the like. The stationary tubular body 24 has a longitudinal slit 24a extending from one end of the other end as well as a pair of flanges 24b,24b between which a thin wire or wires being wound to form the exciting coil body 26. The outer hollow cylindrical member 28 is rotatably mounted on the stationary tubular body 24 through rotary bearings 30,30. The inner surface of the main part 281 (seen as in FIG. 3) of the outer hollow cylindrical member 28 is positioned adjacent to the free edge surface of the flanges 24b,24b of the tubular body 24. In the main part 281 of the outer hollow cylindrical member 28, there are formed spaces 281a,281b. The space 281a accommodates water or another fluid heating medium under a reduced pressure and the space 281b accommodates a temperature sensor such as a thermocouple 32.

If an alternative current source (not shown) is connected to leads 26a,26b for the exciting coil body 26, an alternative magnetic flux to be generated by the exciting coil body 26 generates in a closed magnetic circuit as shown by the ghost line a (FIG. 3) from the stationary tubular body 24 to the same through one of the flanges 24b,24b, the outer hollow cylindrical member 28 and the other flange 24b. Due to the alternative magnetic flux, a short circuit current flows in the outer hollow cylindrical member 28 in its peripheral direction, as shown by the ghost line b in FIG. 4 to generate a so-called Joule heat therein. In this case, the tubular body 24 does not issue any Joule heat, since no short circuit current can flow therein due to the presence of the slit 24a. The outer hollow cylindrical member 28 is also heated based on hysteresis loss, as the alternative magnetic flux passes therethrough. Heat due to the hysteresis loss generates also in the tubular body 24 but a thermal quantity thereof is quite lower than the Joule heat and thus the temperature of the tubular body 24 will not be so much higher. Even if a temperature difference occurrs in any portion in the main part 281 of the outer hollow cylindrical member 28, due to the heating, the heating medium in the space 281a serves to disperse the difference, since the medium in liquid phase at a higher temperature area is vaporized by obtaining its vaporizing latent heat and that in vapor phase at a lower temperature area is liquified by giving its condensing latent heat, and in other words, the entire upper surface of the main part 281 is kept at a uniform temperature by such actions of the heating medium.

FIG. 5 shows another preferred embodiment of the apparatus according to the invention. The apparatus has a structure similar to that as shown in FIGS. 1 to 4 and thus the same reference symbols but with an apostrophic symbol (') are given to its structural elements. According to the apparatus 10', a plurality of baked continuous web-like products can concurrently be produced, which may be severed in width direction to obtain products, each of which has a desired size. This can be attained by, for instance, arranging a plurality of projections to a doctor blade (not shown) which may be similar to that as shown in FIG. 1, the free end of said projections contacting on the outer surface of the transcription roller 16'. Of course, such projections can be formed to a member separate from the doctor blade to attain this purpose.

The invention will now be further explained with reference to Baked Product Manufacturing Examples and Test Example. It is to be noted that a unit "part" in the Examples means—weight part—and a baking apparatus was employed as that illustrated in FIGS. 1 to 4, or a conventional baking oven was also employed.

EXAMPLE 1

To 300 parts of whipped egg, 300 parts of sucrose were added to whip the mixture. In the mixture, 180 parts of cake flour, 120 parts of powdered hydrogenated starch hydrolysate (mean molecular weight of 670), 3 parts of xanthan gum and 11 parts of gluten were added. After gentle stirring of the mixture, 100 parts of melted butter were added and then the resulting material was further gently stirred to obtain a batter. The powdered hydrogenated hydrolysate was obtained by the hydrogenation of glucose syrup (DE 20).

The batter was charged to the apparatus and baked at 170° C. to obtain a sponge cake. The batter was also charged into a wooden frame on a flat pan and baked under the same conditions as above, in an oven.

The cake showed excellent mouth feel and good solubility in the mouth.

EXAMPLE 2

250 parts of egg, 250 parts of sucrose and 800 parts of city milk were mixed and then 100 parts of melted margarine were added thereto to mix in the same. To the mixture, 250 parts of cake flour, 125 parts of dextrin (DE 3), 125 parts of powdered glucose syrup (DE 32) and 3 parts of xanthan gum were added to mix in the same.

Resulting batter was charged to the apparatus and baked at 180° C. for 45 seconds to obtain a crepe sheet having a thickness of 1 mm. The batter was also spread on a flat pan and baked in an oven under the conditions as above to obtain a similar baked product.

The sheet product showed excellent mouth feel and good solubility in the mouth.

EXAMPLE 3

To a mixture of 250 parts of egg, 250 parts of sucrose, 800 parts of city milk and 333 parts of hydrogenated starch hydrolysate (30 weight % of moisture content and mean molecular weight of 740), 250 parts of cake flour and 3 parts of xanthan gum were added and mixed. Then 100 parts of melted margarine were added and mixed thereto to obtain a batter. The hydrogenated starch hydrolysate was obtained by the hydrogenation of glucose syrup (DE 15).

The batter was charged to the apparatus and baked at 180° C. for 60 seconds to obtain a crepe sheet having a thickness of 1 mm. The batter was also spread on a flat pan and baked in an oven under the same conditions as above.

The sheet product showed excellent mouth feel and good solubility in the mouth.

EXAMPLE 4

80 parts of whole milk powder, 700 parts of water, 150 parts of sucrose and 150 parts of hydrogenated starch hydrolysate (30 weight % of moisture content and mean molecular weight of 740) were mixed. To the mixture, 200 parts of egg and 100 parts of melted margarine were added and then 350 parts of cake flour and 25 parts of gluten were added to stir slowly and mix in the same. Finally 3 parts of gelatin swelled previously with water were added thereto to mix in the same. The hydrogenated starch hydrolysate was the same as that used in Example 3.

The resulting batter was charged to the apparatus and baked at 180° C. for 60 seconds to obtain a crepe sheet having a thickness of 1 mm. The batter was also spread on a flat pan and baked in an oven under the same conditions as above.

The sheet product showed relatively high elasticity and hardness. It was judged that such a sheet product is suitable for wrapping a filling in a larger amount or a relatively hard filling such as a salad, hamburg steak or mixture thereof.

EXAMPLE 5

250 parts of egg, 250 parts of sucrose, 800 parts of city milk and 250 parts of powdered hydrogenated starch hydrolysate (mean molecular weight of 670) were mixed. To the mixture, another mixture of 250 parts of cake flour and 3 parts of one of thickening agents as listed in following Table 1 were added and mixed further in the same. Then 110 parts of melted margarine were added and mixed to obtain various batters. The powdered hydrogenated starch hydrolysate was the same as that used in Example 1.

Each of the batters was spread on a flat pan and baked at 180° C. for 60 seconds to obtain crepe sheets having a thickness of 1 mm, in an oven. Each of the batters was also charged to the apparatus and baked under the same conditions as above.

A control was produced in a similar manner to the above, except that the hydrogenated starch hydrolysate in said composition was replaced to cake flour and no thickening agent was added.

These sheet products were subjected to various tests to obtain results shown in the following Table 1.

TABLE 1

| Additive | Hardness | Elasticity | Palatability |
|---|---|---|---|
| no thickening agent | 550 | almost nothing | −0.5 |
| gelatin | 620 | somewhat good | 1.5 |
| locust bean gum | 1100 | " | 0.5 |
| guar gum | 1000 | " | 0.5 |
| xanthan gum | 260 | very good | 1.8 |
| control | 1300 | almost nothing | 0 |

In the Table:
(1) The "hardness" was measured at room temperature with use of a rheometer manufactured by Fudo Industrial Co., Ltd. of Japan. A value of the hardness was shown with a force required for compressing a twice-folded sheet into the thickness of 1 mm, when a cylindrical plunger (10 mm in diameter) is descended in the ratio of 2 cm/minute.
(2) The "elasiticity" was shown with a mean functional judgement made by a expert panel of 20 members.
(3) The "palatability" of the sheet product was judged on solubility in the mouth, elasticity, flexibility and taste by the expert panel as said Item 2 and shown as a mean score based on the following indexes.
good: 2 points
somewhat good: 1 point
ordinary: 0 point
somewhat bad: −1 point
bad: −2 points

EXAMPLE 6

Various batters were produced by changing an amount of xanthan gum in the composition as in Example 2, and each of the batters was spread on a flat pan and baked to obtain sheet products in an oven under the same conditions as above. Each of the batters was also charged to the apparatus and baked under the same conditions as above.

Each of the sheet products was subjected to a sensory test (20 members). Results thereof are shown in the following Table 2.

TABLE 2

| Added amount of xanthan gum (Wt. %) | Mouth feel |
|---|---|
| 0 (control) | too soft, having no elasticity |
| 0.05 | " |
| 0.10 | having good elasticity |
| 0.15 | having suitable softness and elasticity |
| 0.20 | " |
| 0.30 | somewhat hard but has a noticeable elasticity |
| 0.40 | " |
| 0.50 | " |
| 0.60 | too hard, requiring much time for baking and not sufficient in elasticity |

EXAMPLE 7

Various batters were produced by changing an amount of gluten in the composition as in Example 1, and each of the batters was spread on a flat pan and baked to obtain sponge cake products under the same conditions as above. Each of the batters was also charged to the apparatus and baked under the same conditions as above.

Each of the products was subjected to a sensory test (20 members). Results thereof are shown in the following Table 3.

TABLE 3

| Sample symbol | Added amount of gluten (Wt. %) | Apparent specific gravity | Mouth feel |
|---|---|---|---|
| A (control) | 0 | 0.28 | harder than Sample D |
| B (control) | 0 | 0.43 | easy to deform into degassed mass |
| C | 0.5 | 0.41 | " |
| D | 1.0 | 0.32 | good feeling and solubility in mouth |
| E | 1.5 | 0.33 | " |
| F | 2.0 | 0.32 | somewhat hard and not so good in solubility in mouth |

In the Table:
(1) The "apparent specific gravity" was measured by pouring the baked product and a packing material into a measuring cylinder to determine an apparent volume of the baked product based on a difference to the case of that there isn't any baked product, and then the weight of the baked product is divided by the apparent volume value of the baked product.
(2) The "sample cake A" is that obtained by mixing 300 parts of sucrose, 300 parts of egg, 300 parts of cake flour and 100 parts of melted butter to obtain a batter and then baking in a similar manner to Example 1.

EXAMPLE 8

300 parts of egg were whipped and then 300 parts of sucrose were added and whipped butter in the same. To the whipped mixture, another mixture of 150 parts of cake flour, 1.2 parts of xanthan gum, and 150 parts of one of starch hydrolysates listed in the following Table 4 were added and stirred gently in the same to obtain various batters.

Each of the batters was spread on a flat pan and baked as in Example 1 to obtain sponge cakes under the same conditions as above. Each of the batters was also charged to the apparatus and baked under the same conditions as above.

The products were subjected to a sensory test (20 members). Results thereof are shown in the Table 4. It can be recognized therefrom that the starch hydrolysates having a mean molecular weight of about 655 or more are preferable.

TABLE 4

| Starch hydrolysate | Mean molecular weight | Mouth feel | Palatability |
|---|---|---|---|
| Dextrin (DE 3) | — | good | 1.5 |
| Hydrogenated starch hydrolysate | | | |
| A | 670 | " | 1.0 |
| B | 740 | " | 1.3 |
| C | 640 | not so good in softness | −0.5 |
| D | 655 | good | 1.0 |
| Maltose | 342 | not so good in softness | −0.8 |

In the Table:
(1) The hydrogenated starch hydrolysates were those manufactured by Nikken Chemicals Co., Ltd of Japan and mean molecular weights thereof were measured based on those polymerization degrees.
(2) The mouth feeling and palatability were determined in manners as described in Example 5.
(3) The hydrogenated starch hydrolysates A, B, C and D are respectively those obtained by hydrogenation of glucose syrups of DE 20, 15, 30 and 24.

EXAMPLE 9

250 parts of egg, 250 parts of sucrose and 800 parts of city milk were mixed. To the mixture, 500 parts of cake flour and 3 parts of xanthan gum were added and mixed in the same, and then 100 parts of melted margarine were added and mixed further in the same. In such a mixture, the powdered hydrogenated starch hydrolysate was replaced to cake flour in various amount to obtain corresponding batters. Each of the batters was spread on a flat pan and baked as in Example 3 to obtain crepe sheets.

Each of batters was also charged to the apparatus and baked as in Example 3 to obtain crepe sheets.

Each sample was stored at 23° C. for 45 days and the hardness thereof was measured in the course of time. The samples (crepe products) were also subjected to a sensory test. Results are shown in the following Table 5.

TABLE 5

| Sample symbol | Rate (Wt. %) | Aw value | Hardness 0 | 15 (days) | 30 | 45 | Mouth feel |
|---|---|---|---|---|---|---|---|
| A | 0 (control) | 0.94 | 200 | 300 | 400 | 500 | somewhat viscous as compared to Samples B to D |
| B | 20 | 0.91 | 300 | 300 | 300 | 400 | having suitable |
| C | 40 | 0.88 | 300 | 300 | 400 | 400 | softness and |
| D | 60 | 0.82 | 500 | 500 | 500 | 500 | elasticity |
| E | 80 | 0.75 | 1000 | 1000 | 1000 | 1000 | hard texture |

In the Table:
(1) The "rate" means that of a weight ratio of hydrogenated starch hydrolysate to a total weight of cake flour and the added starch hydrolysate,
(2) The symbol "Aw" is a value of water-activity which was measured immediately after having baked the batter, (3) The hardness was measured in a similar manner to Example 5, and (4) The mouth feel was judged as in Example 5.

From the results shown in Table 5, the Sample A shows earlier staling and retrogradation of the starch component in the baked product, as seen from a rapid raise in hardness thereof, and the Sample E has not a good mouth feeling, although there is no change in hardness. While, the Samples B, C and D are suitable, since each of them shows a slow change in hardness and a good mouth feel, and in addition thereto, a lower value in water-activity, which means an improvement in storage stability or withstanding to bacteria growth.

TEST EXAMPLE I 200 parts of egg, 150 parts of sucrose, 80 parts of whole milk powder, 250 parts of hydrogenated starch hydrolysate having a mean molecular weight of 640 (30 weight % of moisture content) and 700 parts of water were mixed. To the mixture, 100 parts of melted margarine were added and mixed in the same and then 250 parts of cake flour and 3 parts of xanthan gum were added and mixed to obtain a batter. The hydrogenated starch hydrolysate was the same as that used in Example 8.

The batter was spread on a flat pan and baked at 180° C. for 20 seconds in an oven to obtain a crepe sheet having a thickness of 1 mm. The batter was also charged to the apparatus and baked under the same conditions as above.

The sheet product was subjected to a sensory test (20 members). The panel members judged that the sheet was not so good in softness and elasticity.

TEST EXAMPLE II 200 parts of egg, 150 parts of sucrose, 80 parts of whole milk powder, 250 parts of hydrogenated starch hydrolysate having a mean molecular weight of 655 (30 weight % of moisture content) and 700 parts of water were mixed. To the mixture, 100 parts of melted margarine were added and mixed in the same and then 250 parts of cake flour and 3 parts of xanthan gum were added and mixed to obtain a batter. The hydrogenated starch hydrolysate was the same as that used in Example 8.

The batter was spread on a flat pan and baked at 180° C. for 20 seconds in an oven to obtain a crepe sheet having a thickness of 1 mm.

The batter was also charged to the apparatus and baked under the same conditions as above to obtain a crepe sheet similar to the above.

The sheet product was subjected to sensory test (20 members). The panel members judged that the sheet had a good mouth feel in softness and elasticity. This shows that the starch hydrolysate to be employed should have a mean molecular weight of at least about 655, to improve mouth feeling of the baked product.

We claim:

1. A composition for producing a sponge cake or crepe sheet consisting essentially of:
   (a) wheat flour, sucrose, egg, edible oil or fat, and milk;
   (b) at least one of 0.1 to 0.5% dry weight basis of a water-soluble thickening agent selected from the group consisting of gelatin, locust bean gum, guar gum and xanthan gum, and also 1.0 to 1.5% dry weight basis of gluten; and
   (c) 20–60% dry weight basis of a starch hydrolysate having a mean molecular weight of at least 655 and selected from the group consisting of glucose syrups, dextrins and hydrogenated starch hydrolysates, the hydrogenated starch hydrolysate obtained by hydrogenation of a material selected from the group consisting of glucose syrups, dextrins and maltodextrins.

2. A composition according to claim 1, wherein the starch hydrolysate is a dextrin or a glucose syrup.

3. A composition according to claim 1, wherein the starch hydrolysate is hydrogenated.

* * * * *